US 11,046,002 B2

(12) United States Patent
Daniels et al.

(10) Patent No.: US 11,046,002 B2
(45) Date of Patent: Jun. 29, 2021

(54) WETTING AGENT ADDITIVE FOR AN IN-LINE QUALITY CHECK OF COMPOSITE-BASED ADDITIVE MANUFACTURING (CBAM) SUBSTRATES

(71) Applicant: Xerox Corporation, Norwalk, CT (US)

(72) Inventors: Marc D. Daniels, Webster, NY (US); Jeffrey W. Drawe, Bloomfield, NY (US)

(73) Assignee: Xerox Corporation, Norwalk, CT (US)

( * ) Notice: Subject to any disclaimer, the term of this patent is extended or adjusted under 35 U.S.C. 154(b) by 235 days.

(21) Appl. No.: 16/369,286

(22) Filed: Mar. 29, 2019

(65) Prior Publication Data

US 2020/0307090 A1    Oct. 1, 2020

(51) Int. Cl.

| | | |
|---|---|---|
| *B29C 64/30* | (2017.01) |
| *B29C 64/112* | (2017.01) |
| *B33Y 10/00* | (2015.01) |
| *B33Y 30/00* | (2015.01) |
| *B33Y 40/00* | (2020.01) |
| *B33Y 70/00* | (2020.01) |
| *B29K 105/00* | (2006.01) |

(52) U.S. Cl.
CPC ............ *B29C 64/30* (2017.08); *B29C 64/112* (2017.08); *B33Y 10/00* (2014.12); *B33Y 30/00* (2014.12); *B33Y 40/00* (2014.12); *B33Y 70/00* (2014.12); *B29K 2105/0032* (2013.01)

(58) Field of Classification Search
CPC ..... B29C 64/112; B29C 64/30; B29C 64/147; B29C 64/393; B29K 2105/0032; B33Y 10/00; B33Y 30/00; B33Y 40/00; B33Y 70/00; B33Y 50/02
See application file for complete search history.

(56) References Cited

U.S. PATENT DOCUMENTS

| | | |
|---|---|---|
| 3,473,205 A | 10/1969 | Zocher |
| 3,774,273 A | 11/1973 | Okamoto et al. |
| 5,173,733 A | 12/1992 | Green |
| 5,943,125 A | 8/1999 | King et al. |
| 6,377,758 B1 | 4/2002 | OuYang et al. |
| 7,050,078 B2 | 5/2006 | Dempski |

(Continued)

FOREIGN PATENT DOCUMENTS

| | | |
|---|---|---|
| EP | 2776233 | 12/2017 |
| WO | WO2014134224 | 9/2014 |

OTHER PUBLICATIONS

Wikipedia (2018). Augmented Reality. Wikipedia, the free encyclopedia. Dec. 6, 2018 from https://en.wikipedia.org/wiki/Augmented_reality.

(Continued)

*Primary Examiner* — Robert J Grun
(74) *Attorney, Agent, or Firm* — Caesar Rivise, PC

(57) ABSTRACT

According to aspects of the embodiments, there is provided process and apparatus to use additives with the clear wetting agent to aid in detection of defective substrates or missing jets. For light colored substrates, dye can be used for darkening of the wetting agent to provide sufficient contrast for defect detection. For dark colored substrates, the dye could be a specific color that a sensor is tuned for. An additive that glows only in the presence of a specific wave length of light could be utilized for any color substrate. By comparing the detected pattern to the desired pattern, end product voids can be greatly reduced or eliminated.

18 Claims, 4 Drawing Sheets

(56) References Cited

U.S. PATENT DOCUMENTS

| | | |
|---|---|---|
| 7,324,081 B2 | 1/2008 | Friedrich et al. |
| 7,463,149 B2 | 12/2008 | Friedrich et al. |
| 8,116,585 B2 | 2/2012 | Wu et al. |
| 8,496,370 B2 | 7/2013 | Hsu |
| 8,756,894 B2 | 6/2014 | Swartz et al. |
| 8,786,686 B1 | 7/2014 | Amirparviz |
| 9,266,287 B2 | 2/2016 | Kautz et al. |
| 9,393,770 B2 | 7/2016 | Swartz et al. |
| 9,507,788 B2 | 11/2016 | Pavlov et al. |
| 9,683,950 B2 | 6/2017 | Sarrazin et al. |
| 9,740,974 B2 | 8/2017 | Kumar et al. |
| 9,776,376 B2 | 10/2017 | Swartz et al. |
| 9,827,754 B2 | 11/2017 | Swartz et al. |
| 9,833,949 B2 | 12/2017 | Swartz et al. |
| 10,046,552 B2 | 8/2018 | Swartz et al. |
| 2002/0133264 A1 | 9/2002 | Maiteh et al. |
| 2006/0255525 A1 | 11/2006 | Dinatale et al. |
| 2013/0171431 A1 | 7/2013 | Swartz et al. |
| 2014/0085620 A1 | 3/2014 | Lobovsky et al. |
| 2014/0238173 A1 | 8/2014 | Swartz et al. |
| 2014/0257549 A1 | 9/2014 | Swartz et al. |
| 2015/0034123 A1 | 2/2015 | Pressacco et al. |
| 2015/0158246 A1 | 6/2015 | Swartz et al. |
| 2015/0231825 A1 | 8/2015 | Swartz et al. |
| 2016/0082657 A1 | 3/2016 | Swartz et al. |
| 2016/0082658 A1 | 3/2016 | Swartz et al. |
| 2016/0260261 A1 | 9/2016 | Hsu |
| 2016/0297142 A1 | 10/2016 | Bheda et al. |
| 2016/0339645 A1 | 11/2016 | Swartz et al. |
| 2017/0106586 A1 | 4/2017 | Keoshkerian et al. |
| 2017/0144426 A1 | 5/2017 | Moore et al. |
| 2017/0151719 A1 | 6/2017 | Swartz et al. |
| 2017/0291223 A1 | 10/2017 | Swartz et al. |
| 2017/0297303 A1 | 10/2017 | Swartz |
| 2017/0368744 A1 | 12/2017 | Zona et al. |
| 2018/0008141 A1 | 1/2018 | Krueger |
| 2018/0022065 A1 | 1/2018 | Swartz et al. |
| 2018/0072001 A1 | 3/2018 | Swartz et al. |
| 2018/0141305 A9 | 5/2018 | Swartz et al. |
| 2018/0264725 A1 | 9/2018 | Swartz et al. |
| 2018/0264732 A1 | 9/2018 | Swartz et al. |
| 2019/0067077 A1 | 2/2019 | Muramoto |

OTHER PUBLICATIONS

Impossible Objects' CBAM Pilot Project (video), https://www.youtube.com/watch?v=Dn37IXU2K0M, retrieved Dec. 12, 2018.

WETTING AGENT ADDITIVE FOR AN IN-LINE QUALITY CHECK OF COMPOSITE-BASED ADDITIVE MANUFACTURING (CBAM) SUBSTRATES

BACKGROUND OF THE INVENTION

This disclosure relates generally to systems and methods for composite-based additive manufacturing, and more particularly, to such process that render individual laminate layers to be built up to form and/or manufacture three-dimensional objects, parts and components (3D objects).

BACKGROUND

Traditional object, part and component manufacturing processes, which generally included varying forms of molding or machining of output products, have expanded to include commercial implementations of a new class of techniques globally referred to as "additive manufacturing" or composite based additive manufacturing (CBAM). These AM techniques generally involve processes, alternatively referred to as "Solid Freeform Fabrication (SFF)" or "3D printing" in which layers of additive materials, sometimes toxic or otherwise hazardous in an unfinished state are sequentially deposited on an in-process 3D object according to a particular material deposition and curing scheme. As each layer is added in the 3D object forming process, the new layer of material is added and adhered to the one or more already existing layers. Each AM layer may then be individually cured, at least partially, prior to deposition of any next AM layer in the 3D object build process. This sequential-layer material addition/joining throughout a 3D work envelope is executed under automated control of varying levels of sophistication.

AM manufacturing techniques include, but are not limited to, those techniques that have come to be referred to broadly as "3D printing" techniques usable for producing 3D printed objects. 3D printing techniques employ one or more processes that are adapted from, and appear in some respects to be similar to, well-known processes for forming two-dimensional (2D) printed images on image receiving media substrates. Significant differences in the output structures produced by the 3D printing techniques are generally based on (1) a composition of the deposited materials that are used to form the output 3D printed objects from the 3D printer; and/or (2) a number of passes made by the "print" heads in depositing comparatively large numbers of successive (and very thin) layers of the deposition material to build up the layers to the form of the output 3D printed objects.

A number of powder-based AM techniques have been commercialized. These include Selective Laser Sintering (SLS), as well as certain adaptations of toner-based 2D printing technologies for 3D printing. Those of skill in the art recognize that, in certain of these implementations, no separate support structures are typically required to support the creation of certain complex shapes. In certain of these processes, powdered materials are selectively consolidated into 3D objects with excess powder being manually removed. In an SLS process, for example, a thin layer of powder is deposited in a workspace container and the powder is then fused together using a laser beam that traces the shape of the desired cross-section. The process is repeated by depositing layers of powder thus building the 3D object in this manner layer by layer. In a typical toner-based 3D printing process, a binder material selectively binds powder deposited in layers in a printing technology used to generally print the binder in a shape of a cross-section of the 3D object on each layer of powder.

An expanding number of AM or 3D printing processes and techniques are now available. Principal distinguishing characteristic between the multiplicities of these AM or 3D printing processes are in the manner in which the layers are deposited to create the output 3D objects, and in the materials that are used to form the output 3D objects.

Certain of the AM techniques (as this term will be used throughout the balance of this disclosure to refer to various 3D object layering and build techniques including 3D printing) melt or soften materials to produce the build layers using techniques such as, for example, selective laser melting or sintering of an input material through applied heat. Others of the AM manufacturing techniques deposit and cure liquid materials using technologies for the deposition of those liquid materials such as jetted (ink) material "printing" techniques.

Some 3D printers use a process of printing plastic in the image of the part cross section onto a fibrinous sheet, such as carbon fiber, and then stacking many sheets to form a stack that will become a 3D part after the stack is heated to melt or cure the plastic and the stack compressed. The unwanted, excess substrate is then removed using mechanical or chemical process. Additive manufacturing is a slow process and in the current process mistakes are not discovered until the object is completed. Defective objects are costly in that it squanders resources and process time. Therefore, there is a need in the art for an in-line quality check of the substrate before resources are applied to objects that are going to be discarded.

SUMMARY

According to aspects of the embodiments, there is provided process and apparatus to use additives with the clear wetting agent to aid in detection of defective substrates or missing jets. For light colored substrates, dye can be used for darkening of the wetting agent to provide sufficient contrast for defect detection. For dark colored substrates, the dye could be a specific color that a sensor is tuned for. An additive that glows only in the presence of a specific wave length of light could be utilized for any color substrate. By comparing the detected pattern to the desired pattern, end product voids can be greatly reduced or eliminated.

BRIEF DESCRIPTION OF THE DRAWINGS

Various exemplary embodiments of the disclosed apparatuses, mechanisms and methods will be described, in detail, with reference to the following drawings, in which like referenced numerals designate similar or identical elements, and.

DETAILED DESCRIPTION

Figure 1:
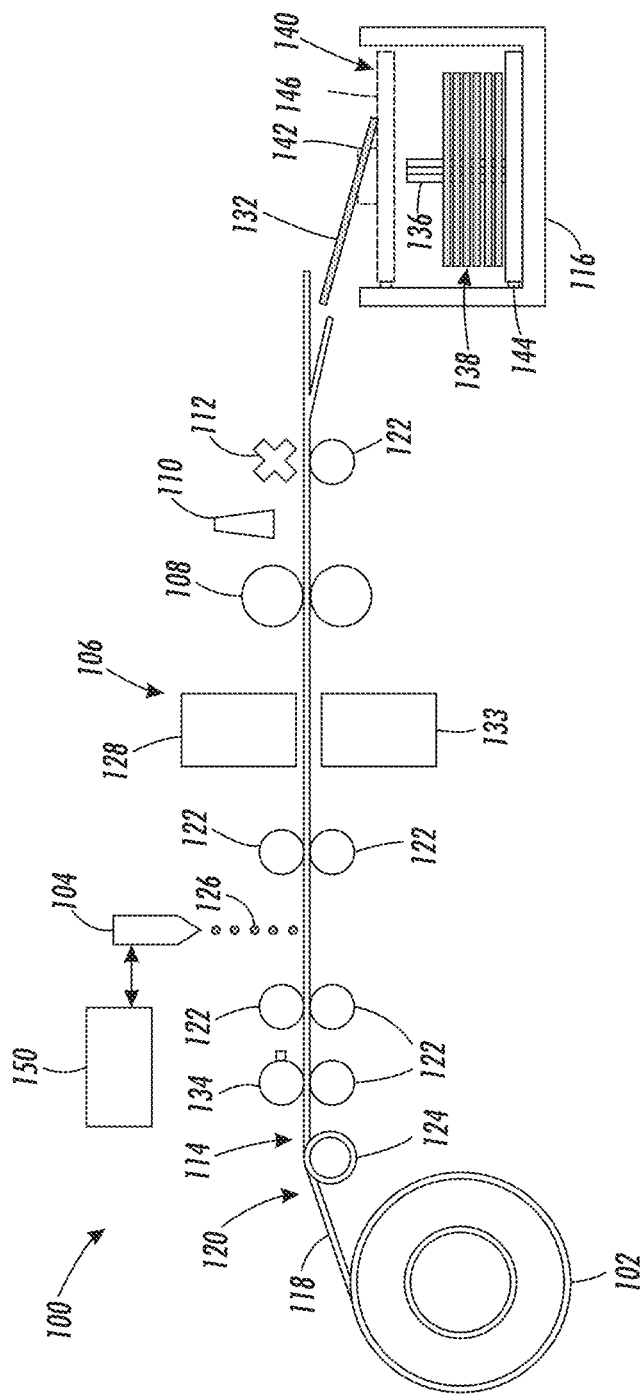
FIG. 1 is a side view of an additive manufacturing system for printing 3D objects in accordance with an example of the embodiments.

Illustrative examples of the devices, systems, and methods disclosed herein are provided below. An embodiment of the devices, systems, and methods may include any one or more, and any combination of, the examples described below. This invention may, however, be embodied in many different forms and should not be construed as limited to the embodiments set forth below. Rather, these exemplary embodiments are provided so that this disclosure will be thorough and complete, and will fully convey the scope of the invention to those skilled in the art. Accordingly, the exemplary embodiments are intended to cover all alternatives, modifications, and equivalents as may be included within the spirit and scope of the apparatuses, mechanisms and methods as described herein.

In one aspect, a method for in-line quality checking of an object manufacturing system that fabricates a three-dimensional (3D) object, comprising maintaining in a reservoir a wetting agent that can be selectively deposited in a desired pattern onto portions of a sheet of substrate material, wherein a sheet corresponds to a layer of the 3D object; adding a contrast material to the reservoir of wetting agent so as to be detectable by an imaging sensor; capturing with the imaging sensor an image of the sheet of substrate material after depositing the wetting agent with contrast material; and using the captured image of the sheet of substrate material to ascertain deviations as a result of a comparison.

In another aspect, the method further comprising using at least one inkjet printhead to selectively deposit the wetting agent with the contrast material.

In another aspect, wherein the contrast material is an additive that glows when stimulated by a specific wavelength of light energy.

In yet another aspect, wherein the sheet of substrate material is a high contrast surface or a low contrast surface.

In still another aspect, wherein the contrast material is selected based on the contrast surface of the substrate material.

In yet another aspect, wherein the contrast material is a dye.

In another aspect, wherein the ascertained deviations is at least one of a defective substrate, or a missing printhead.

In another aspect, wherein the comparison is comparing the captured image of the sheet of substrate material to a reference image.

In a further aspect, using an imaging source to emit a specific wavelength of light energy coordinated with a time instant of an irradiation session such that the contrast material gives out a contrast-enhancing property for a duration of the irradiation session.

In another aspect, wherein the imaging source emits a signal with a wavelength of ultra violet (UV), infrared (IR), or both.

still yet a further aspect, an apparatus for in-line quality checking of an object manufacturing system that fabricates a three-dimensional (3D) object, comprising a reservoir a wetting agent that can be selectively deposited in a desired pattern onto portions of a sheet of substrate material, wherein a sheet corresponds to a layer of the 3D object; an inlet at the reservoir of wetting agent to receive a contrast material so that the wetting agent when on the substrate is detectable by an imaging sensor; an imaging sensor for capturing an image of the sheet of substrate material after depositing the wetting agent with contrast material; and a processor coupled to a storage device, wherein the storage device contains instructions operative on the processor to ascertain deviations as a result of a comparison of the captured image of the sheet of substrate material.

We initially point out that description of well-known starting materials, processing techniques, components, equipment and other well-known details may merely be summarized or are omitted so as not to unnecessarily obscure the details of the present disclosure. Thus, where details are otherwise well known, we leave it to the application of the present disclosure to suggest or dictate choices relating to those details. The drawings depict various examples related to embodiments of illustrative methods, apparatus, and systems for printing onto a substrate web and automatically stacking individual sheets of the web for AM manufacturing.

When referring to any numerical range of values herein, such ranges are understood to include each and every number and/or fraction between the stated range minimum and maximum. For example, a range of 0.5-6% would expressly include the endpoints 0.5% and 6%, plus all intermediate values of 0.6%, 0.7%, and 0.9%, all the way up to and including 5.95%, 5.97%, and 5.99%. The same applies to each other numerical property and/or elemental range set forth herein, unless the context clearly dictates otherwise.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

The terms "media", "web", "web substrate", "print substrate" and "substrate sheet" generally refers to a usually flexible physical sheet of paper, polymer, Mylar material, plastic, or other suitable physical print media substrate, sheets, webs, etc., for images, whether precut or web fed. The listed terms "media", "print media", "print substrate" and "print sheet" may also include woven fabrics, non-woven fabrics, metal films, carbon fiber reinforced material and foils, as readily understood by a skilled artisan.

The term "marking material" as used herein may refer to printing matter deposited by an image forming device onto a web substrate to form an image on the substrate. The listed term "marking material" may include inks, toners, metal particles, plastics, pigments, powders, molten materials, polyamide, nylon, glass filled polyamide, epoxy resins, bio-based resins, wax, graphite, graphene, carbon fiber, photopolymers, polycarbonate, polyethylene, Polylactic acid (PLA), Polyvinyl alcohol (PVA), ABS filament, high-density polyethylene (HDPE), high impact polystyrene (HIPS), Polyethylene terephthalate (PETT), ceramics, conductive filament and other ink jet materials.

The term 'image forming device", "printing device" or "printer" as used herein encompasses any apparatus that performs a print outputting function for any purpose, such as a digital copier, scanner, image printing machine, xerographic device, digital production press, document processing system, image reproduction machine, bookmaking machine, facsimile machine, multi-function machine, or the like and can include several marking engines, feed mechanism, scanning assembly as well as other print media processing units, such as paper feeders, finishers, and the like. An image forming device can handle sheets, webs, marking materials, and the like. An image forming device can place marks on any surface, and the like and is any machine that reads marks on input sheets; or any combination of such machines. A 3D printer can make a 3D object, and the like. It will be understood that the structures depicted in the figures may include additional features not depicted for simplicity, while depicted structures may be removed or modified.

The term "controller" is used herein generally to describe various apparatus relating to the operation of one or more device that directs or regulates a process or machine. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

The examples further include at least one machine-readable medium comprising a plurality of instructions, when executed on a computing device, to implement or perform a method as disclosed herein. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments.

Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

As used herein, unless otherwise specified, the term "object" can also mean part, element, piece, or component. As used herein, an object refers to a 3D object to be individually built, or actually built, by a 3D printing system (printer). An object, as referred herein, is built by successively adding layers so as to form an integral piece. Some printers are capable of building, as part of the same print job, a plurality of independent pieces from a 3D model including a plurality of independent 3D objects. An object may include void spaces embedded in the object body.

Although embodiments of the invention are not limited in this regard, discussions utilizing terms such as, for example, "processing," "computing," "calculating," "determining," "using," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

FIG. 1 is a block diagram of an exemplary AM system 100 for printing 3D objects. The AM system 100 may include components such as a material feeder 102, an image-forming device 104, a powder subsystem 106, a fuser 108, a sensor 110, a cutter 112, a transfer subsystem 114, a stacker subsystem 116, and other features that connect and control the various components. While exemplary components are shown in FIG. 1, various alternative and optional components are also suitable for use with the system 100.

In illustrative implementations, a three-dimensional (3D) object is printed in accordance with a computer 3D model of the object, created by a computer-aided design (CAD) program. For example, the CAD program may be a free-form non-uniform rational basis spline (NURBS) program, or the CAD program may be Solid Works®. In the AM system 100, marking material 148 (e.g., powder) is selectively deposited by powder subsystem 106 in a physical pattern on a substrate material 118 (or substrate sheets thereof) that corresponds to a "positive image' of a thin slice or layer of the 3D object as defined by image forming device 104. For each slice of the 3D object, powder is attached in a pattern that correspond to positions in the slice where the 3D object exists, and powder is not attached to the substrate in positions in the slice where the 3D object does not exist. Thin slices of the 3D CAD model may be created, for example, by starting with a 3D model in STL file format and using the Slice Commander feature of Netfabb® Studio software (available from netfabb GmbH, Parsberg, Germany) to create the thin slices. This cycle of selectively patterning substrate sheets repeated for as many additional substrate sheets as required for making the specified 3D part or object, with each sheet normally representing a layer of the 3D part or object.

The material feeder 102 holds the substrate material 118 (e.g., carbon fiber, paper) in roll or sheet form (here shown in roll form for example) and places the substrate material in proper position for transfer to the image-forming device 104. Carbon fiber is typically dark grey, but other substrates may be of other colors such as a light color. The substrate material 118 may be transferred to the image-forming device 104 via the transfer subsystem 114, which may include a tensioning mechanism 120 together with feed rollers 122 used to hold and advance the web defined by the length of the substrate material fed through the AM system 100. The tensioning mechanism 120 may include one or more rollers 124 situated to keep the substrate material 118 taught as it is fed components of the AM system. The web of substrate material 118 can extend through all of the components of the AM system, including the image-forming device 104, the powder subsystem 106, the fuser 108, the sensor 110, and then be cut by the cutter 112 into single sheets prior to stacking, as discussed in greater detail below.

The image-forming device 104 may then deposit a pattern of fluid 126 in image-wise fashion at precise locations onto the substrate material 118. The fluid 126 is selectively deposited on the substrate material 118 so that some parts of the material are covered with liquid as a positive image of a slice of a 3d object, and some parts of the material are not. The fluid 126 is commonly referred to as a wetting agent generally comprising of Polyethylene Glycol (PEG) which a clear fluid. The pattern of fluid 126 may be deposited via a variety of approaches. For example, the image-forming device 104 may include a thermal inkjet head or a piezoelectric inkjet head to dispense the fluid. In examples, the image-forming device 104 may apply air pressure to dispense the fluid 126. The image-forming device 104 may also include a solenoid valve if air pressure is used to control the release of air or dispensing of fluid.

In some cases, the fluid that is selectively deposited may be water or an aqueous solution that includes a material that slows the evaporation of water. For example, the aqueous solution may include 2-pyrrolidinone. In other cases, a different fluid, such as an alcohol may be selectively deposited. For example, if the substrate material 118 is water sensitive (e.g. polyvinyl alcohol, PVOH), then water may distort or dissolve the substrate material. In that case, an alcohol may be used as the fluid that is selectively deposited. In some cases, to prevent a liquid fluid that is selectively deposited from spreading or being excessively absorbed into the substrate, it is helpful to apply a surface energy modifier or repellent to the substrate before selectively depositing the liquid fluid.

The material feeder 102 then transfers the substrate material 118 to the powder subsystem 106, which includes a powder applicator 128 and a powder remover 130 that may be provided as separate components or integrated into a single component. In either arrangement, the powder applicator 128 is configured to deposit a 3D object powder (e.g., thermoplastic powder) onto the substrate material. The powder is configured to adhere to the areas of the substrate that have been made wet by the image-forming device 104, i.e., the layer images. In other words, the powder applicator 128 deposits powder, such as, but not limited to, thermoplastic powder, onto the surface of the substrate material 118 on which patterned layer shapes have just been printed. The powder sticks to the printed (wet) areas on the sheet, but does not adhere to portions of the substrate that are not covered with the fluid.

In typical application, the powder applicator 128 may include a trough containing the powder. The trough may have a slitted opening on its underside and is connected to an electromechanical vibrator of the powder subsystem. The vibrator, when active, causes the powder to flow downward through the slitted opening and out of the trough onto the substrate while it moves under the trough. The vibrator is actuated by a controller 150 that may include a sensor circuit that senses the presence of the patterned fluid on the substrate underneath. When the patterned fluid has completely passed, the vibrator may deactivate to cease powder flow from the trough.

The powder may be selectively deposited by other approaches. For example, the powder may be selectively deposited by flooding one side of a layer of substrate with powder, then selectively heating the opposite side of the substrate with an appropriate device such as a thermal printhead or print head. In this approach, the thermal print head includes a high-resolution array of heating elements, which may be selectively turned on or off. In the areas that are heated, the powder melts and adheres to the substrate. The excess powder that has not adhered is removed, for example by vacuuming the excess powder by the powder remover 130 or turning the substrate over with the excess powder falling off the substrate via gravity.

Alternatively, powder may be deposited using a selective deposition technique similar to that employed in xerographic printing. In this approach, an electrical charge is imparted to powder particles, which are directed toward the substrate 118 and then selectively adhere to some portions of the substrate, but not others due to electrostatic attraction or repulsion. The powder particles adhere to portions of the substrate that have an opposite electrical charge, or that are adjacent to a substrate surface that has such a charge, and are repelled from portions of the substrate that have the same electrical charge or that are adjacent to a substrate surface that has such a charge.

The powder may be alternatively deposited using a selective deposition technique similar to that employed in magnetographic printing. In this approach, powder selectively adheres to some portions of the substrate layer, but not others due to magnetostatic interactions between the powder and the substrate surface, or a substrate layer adjacent to the substrate surface. For example, the powder may be a single component magnetic toner, a colloidal suspension (e.g., a ferrofluid), or a dual component toner. A variety of magnetic pigments, such as magnetite (FeO) or ferric oxide ((FeO), may be used for the toner in this approach.

In all of the above examples, the step of selectively depositing powder may include a substep of directing solid powder toward the substrate 118 in a non-selective manner. For example, this substep may include flooding the entire surface of the substrate with powder. Or for example, in the xerographic or magnetographic examples, this substep may include sending electrically charged or magnetized powder toward the entire substrate layer Still referring to FIG. 1, the powder remover 130 then removes any powder that does not adhere to the substrate. The powder may be removed from the substrate, for example, by vacuuming the excess powder off as it moves adjacent the powder remover. In typical application, the powder remover 130 may include a vacuum having a vacuum motor coupled to a cyclone (to be described later). In operation, the vacuum pulls the powder that does not adhere to the substrate, while powder applied to the printed areas remain. The cyclone may recirculate the vacuumed powder back to the powder applicator 128 for reuse, as well understood by a skilled artisan. In certain circumstances the amount of powder removal from the vacuum may be insufficient since some unwanted powder may still reside on the substrate material. For this reason the powder remover 130 may include an air knife after the vacuum to remove any remaining excess powder from the substrate. The removed excess powder may also be recirculated by the cyclone back to the powder applicator for reuse.

The powder system 106 can be set to run continuously so that, once the substrate material 118 passes the image forming device 104, the substrate automatically travels through the powder system 106. Alternatively, the controller 150 in communication with the transfer subsystem 114, the image forming device and the powder system 106 can instruct the powder applicator 128 and powder remover 130 or subsystems thereof to turn on and off at the appropriate times.

After the substrate 118 has had powder applied and excess powder removed, the remaining powder may be melted onto the substrate so that the powder more permanently affixes to the printed areas of the substrate and is thus protected from displacement, disruption, or falling off during subsequent processing steps. To this end, an optional fuser 108 may be disposed after the powder system 106. The fuser 108 may be disposed above, below, or adjacent to the substrate leading out of the powder remover 130. The fuser 108 may be, for example but not limited to, radiant, IR, or other heating approach sufficient to melt and thereby fix the patterned powder to the substrate. As the substrate 118 travels out of the powder system 106, the heat from the fuser 108 melts the powder on the substrate surface causing it to fix to the substrate.

The AM system 100 may optionally have a sensor 110 (e.g., an imaging device such as a camera) to ensure that the system has not malfunctioned, that the appropriate amount of powder is deposited, that the substrate is moving as desired, that individual substrate sheets are moving as desired, and other quality assurance aspects of the process. The sensor may operate based, for example, on input from the controller 150, or automatically upon detection of an edge of printed material or a substrate sheet.

As noted above in the exemplary AM system 100, the roll 102 of substrate material 118 is mounted and situated ahead of the image-forming device 104. While not being limited to a particular theory, the web of substrate material 118 can extend through all of the components of the AM system, including the image-forming device 104, the powder subsystem 106, the fuser 108, the sensor 110, and then be cut by the cutter 112 into single sheets 132 prior to stacking. In examples, the web of substrate material 118 may be cut by the cutter 112 into single sheets 132 at any prior point in the process. For example, the web may be converted to a single sheet prior to advancing the resulting substrate sheet to the image-forming device 104. Likewise, the web may be converted to a single sheet after the image-forming device 104 and before the powder subsystem 106, or after the powder subsystem and before the fuser 108, or after the fuser and before the sensor 110. In examples, the web may be precut into individual sheets, with the sheets arranged as a stack of sheets held by the material feeder for individual processing by the AM system. The cutter 112 may cut the sheet with a mechanical instrument (e.g., blade, punch) or other approach (e.g., laser) as well understood by a skilled artisan.

In examples, the AM system 100 may also include a punching device 134 for placing registration apertures in the substrate material 118 or substrate sheets 132 thereof at desired locations. The registration apertures are placed in precise, pre-defined positions relative to the position of the substrate sheet for precise alignment of the patterned marking material images printed onto the sheets. This can be accomplished by mounting the punching device 134 proximate to the substrate material 118 being moved by the transfer subsystem 114, for example, on the same frame that the image-forming device 104 and powder subsystem 106 are placed, or using other alignment mechanisms that are well known in the art. The punching device 134 may include a hard instrument that pokes registration apertures out of the substrate material, or a laser cutter that cuts registration apertures from the substrate material.

In order to complete the AM process of forming a 3D object, the powder printed substrate sheets 132 may be stacked by aligning the substrate sheets via their registration apertures, and fused together to attach the stacked substrate sheets into the combined object. Then the uncoated substrate material may be removed from the combined object by, for example, abrasive blasting, chemical removal or dissolution. The stacker subsystem 116 is configured for stacking the cut printed substrate sheets 132 in register, based on the aforementioned registration apertures. As can be seen in FIG. 1, the stacker subsystem 116 receives the printed substrate sheets 132 with the registration apertures aligned about registration pins 136 of the stacker subassembly to form a stack 138 of the printed sheets.

After stacking the printed sheets, the patterned powder on the sheets may be combined and hardened into the 3D object. FIG. 1 shows the stacker subsystem 116 including a compressive device 140 including one or more elastic components (e.g., springs 142) to maintain pressure on the substrate sheets 132 even if they compress. After a number of substrate sheets (layers) have been placed in the stacker subsystem 116, one on top of the other on bed plate 144, the inserted substrate sheets may be compressed together with the spring 142 exerting presser on top plate 146 towards the bottom bed plate.

The compressed stack 138 may be heated, for example, in an oven (not shown). Heat from the oven causes the thermoplastic powder to melt. The molten material coats the substrate layers. The compressive device 140, with the substrate stack 138 in it, is then removed from the oven, and the substrate layers are allowed to cool. The molten material then solidifies. As it does so, it binds (fuses) the substrate sheets 132 together. Excess substrate (that has not been covered by the solidified material) is then removed as noted above by, for example, abrasive blasting, chemical removal or dissolution to result in a 3D printed object.

The process carried out by the AM system 100 may be sequenced and monitored using one or more controllers 150. The controller 150 may read and execute build instructions generated by an outboard computer (not depicted) based on a 3D model of the object that is to be printed. For example, the material feeder 102, image-forming device 104, powder subsystem 106, fuser 108, sensor 110, cutter 112, transfer subsystem 114, punching device 134 and stacker subsystem 116 may operate as discussed herein based on input from the controllers. Thus while the controller 150 is shown in communication with the image-forming device 104, it is understood that the controller may be in communication with any component of the AM system.

Figure 2:
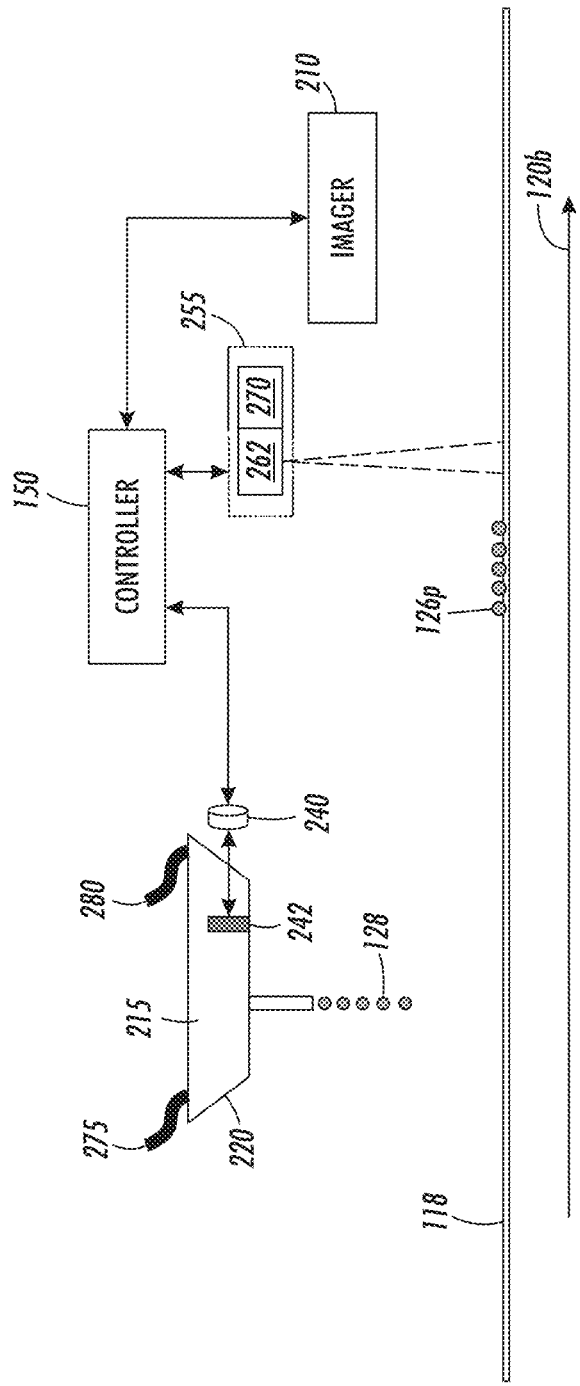
FIG. 2 is a block diagram of a system for adding contrast agent to reservoir of wetting material to perform in-line quality checking of an object manufacturing system in accordance to an embodiment.

The exemplary controller 150 may provide input, to or be a component of a controller for executing the AM 3D object forming process in a system such as that depicted in FIGS. 1-2.

Next, a second embodiment of the present invention will be described. Note that portions which are the same as those in the first embodiment described above are denoted by the same reference numerals, and descriptions of the same portions as those as in the first embodiment will be omitted.

FIG. 2 is a block diagram of a system for adding contrast agent to reservoir of wetting material to perform in-line quality checking of an object manufacturing system in accordance to an embodiment.

Figure 3:
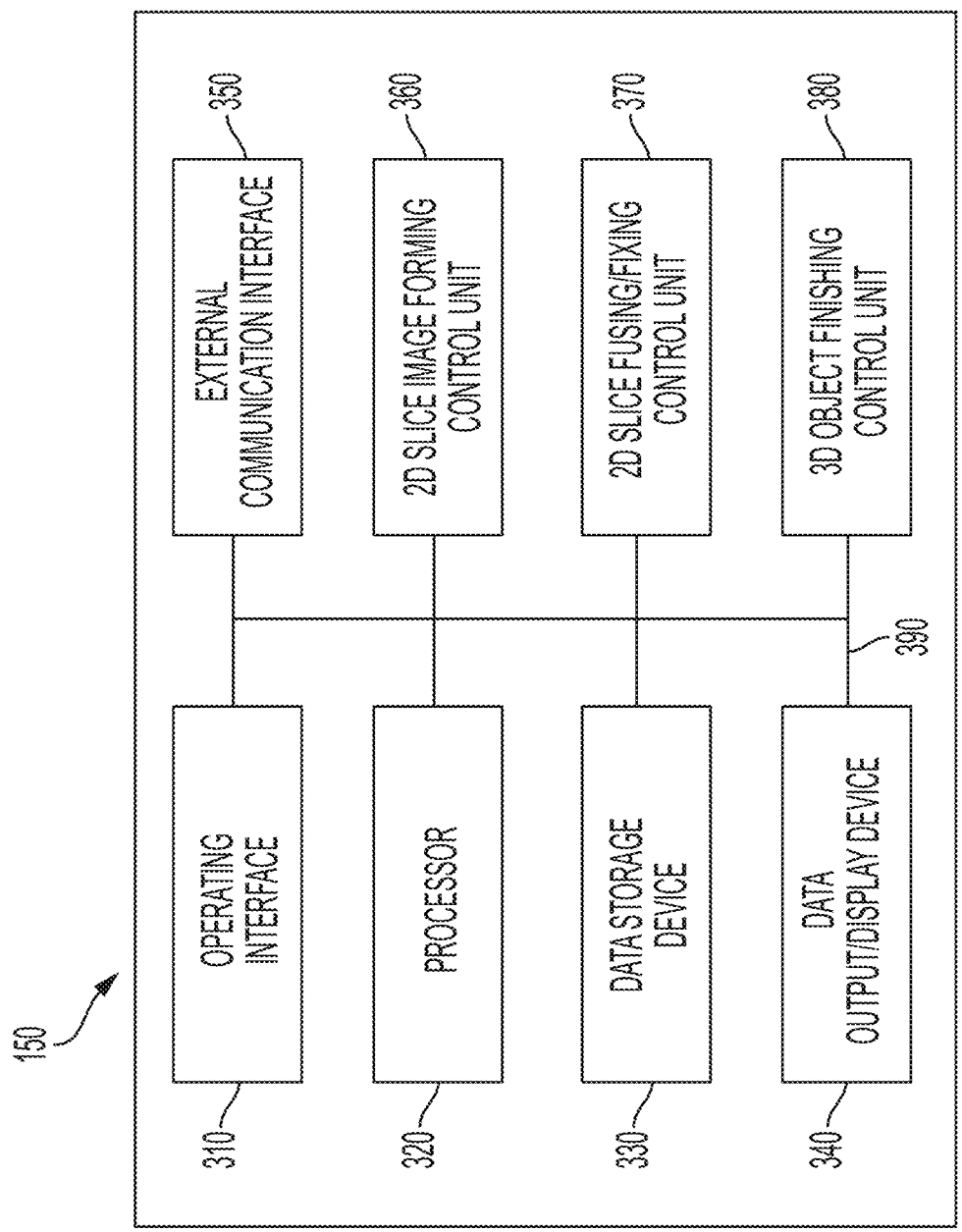
FIG. 3 illustrates a block diagram of an exemplary control system for implementing an additive manufacturing and in-line quality checking of an object manufacturing system in accordance to an embodiment; and, FIG. 4 is a flowchart depicting the operation of an exemplary method for in-line quality checking of an object manufacturing system in accordance to an environment.

With reference to FIGS. 2 and 3 which shows controller 150, reference 210 and 255 show an imaging assembly and reference 240 and 242 indicates as a whole an optical-type turbidity sensor for composite based additive manufacturing (CBAM), as shown in FIG. 1, of which only a tank/reservoir 220 is shown, provided with a reservoir seat (not shown) for the sensor (240,242) and in use full of a wetting agent or pattern of fluid of the AM system 100, the physical features of which, such as optical absorbance (haziness/clarity) and imaging to ascertain substrate quality, are intended to be measured.

The substrates 118 are carbon fiber or other materials. The carbon fiber is typically a dark grey, but other substrates may be other colors. The clear fluid such as wetting agent 126 is difficult to see visually and difficult to be detected by sensors such as Image On Web Array (IOWA) commonly used in additive manufacturing. This disclosure proposes to judiciously use additives in the wetting agent 126 to aid in detection of defective substrates or missing jets. For light colored substrates, dye can be used for darkening of the wetting agent to provide sufficient contrast for defect detection. For dark colored substrates, the dye could be a specific color that the sensor is tuned for such as infrared (IR) or ultra violet (UV) light. An additive that glows only in the presence of a specific wave length of light (IR, UV) could be utilized for any color substrate. By comparing the detected pattern (captured image) to the desired pattern (reference image), end product voids can be greatly reduced or eliminated.

In various illustrative embodiments, the wetting agent material 215 may include a fluid 126 comprising a combination of a contrast material and wetting agent, for example. The apparatus may also include a fluid outlet supported for contact with the wetting/contrast agent reservoir 220 for the wetting agent material 215. An example of a fluid outlet is one or more printhead that produce a series of jets projecting in a direction perpendicular to the major dimension of the printhead. These jets may be selectively charged by a series of electrodes (not shown), as is well known in the art. Reservoir 220 containing wetting agent 215, and a first inlet port 280 for delivering a substantially clear wetting agent to the reservoir 220 and an optional second inlet port 275 for delivering a contrast agent that is combined in the reservoir 220 to form the pattern of fluid 126. Contrast agent is any additive that can be added to the wetting agent generally clear as delivered by first port 280 that can aid in the detection of defective substrates or missing jets of a printhead. In conjunction with the wetting dispenser there is shown a device for testing the turbidity of the contrast/wetting agent mixture by using a turbidity sensor that comprises a source 242 and a receiver 240 coupled to a processor such as processor 320 of controller 150 which provides an indication of the turbidity of the mixture at the reservoir 220.

After the fluid 126 is deposited on substrate 118, the deposited fluid 126 can be used in combination imager 210 which is the same as imager 110 described in FIG. 1, imaging source 255, and controller to perform an in-line quality assessment of the substrate 118 and the mechanism used at reservoir 220 to dispense the wetting agent.

In accordance with types of imaging, including conventional imaging and erasable media imaging, an imaging source 255 such as a raster output scanner (ROS) or lamps can be utilized to output an infrared (IR) wavelength from light source 262, a ultra violet (UV) wavelength from light source 270, or output a visible wavelength from light source 255. These light could be operated and timed to create of an irradiation session such that the contrast material gives out a contrast-enhancing property for a duration of the irradiation session. Using these sources of light in combination with the imager 210 to capture an image of the substrate during the manufacturing process the quality of the operation can be ascertained in real time thus preventing the waste of value resources.

At controller 150 a comparison is performed between the acquired image and the baseline image or reference image to determine a difference. The comparison of the images may provide an indication a presence of a defect in capture image and its corresponding substrate. The comparison between images may be performed in various ways. For example, the images may be provided in gray scale, pseudo color, and/or other raster forms. The comparison may be performed by manual inspection, or by a system designed to analyze differences in color and/or gray scale between the two images. In an embodiment, the images to be compared are provided as grayscale images and the baseline gray-level subtracted from the gray-level of the image provided in block 470 to determine a difference.

FIG. 3 illustrates a block diagram of an exemplary control system 150 for implementing an additive manufacturing (AM) and in-line quality checking of an object manufacturing system in accordance to an embodiment. The exemplary control system 150 may provide input, to or be a component of a controller for executing the AM 3D object forming process in a system such as that depicted in FIG. 1.

The exemplary control system 150 may include an operating interface 310 by which a user may communicate with the exemplary control system 150. The operating interface 310 may be a locally-accessible user interface associated with an AM 3D object forming device. The operating interface 310 may be configured as one or more conventional mechanism common to control devices and/or computing devices that may permit a user to input information to the exemplary control system 150. The operating interface 310 may include, for example, a conventional keyboard, a touchscreen with "soft" buttons or with various components for use with a compatible stylus, a microphone by which a user may provide oral commands to the exemplary control system 150 to be "translated" by a voice recognition program, or other like device by which a user may communicate specific operating instructions to the exemplary control system 150. The operating interface 310 may be a part or a function of a graphical user interface (GUI) mounted on, integral to, or associated with, the AM 3D object forming device with which the exemplary control system 150 is associated.

The exemplary control system 150 may include one or more local processors 320 for individually operating the exemplary control system 150 and for carrying into effect control and operating functions for AM 3D object forming, and specifically for implementing a tri-level electrophotographic layer forming scheme. Processor(s) 320 may include at least one conventional processor or microprocessor that interpret and execute instructions to direct specific functioning of the exemplary control system 150, and control of the AM 3D object forming process with the exemplary control system 150.

The exemplary control system 150 may include one or more data storage devices 330. Such data storage device(s) 330 may be used to store data or operating programs to be used by the exemplary control system 150, and specifically the processor(s) 330. Data storage device(s) 330 may be used to store information regarding, for example, one or more 3D object models for producing 3D objects in an AM 3D object forming device with which the exemplary control system 150 is associated. The stored 3D object model information may be devolved into data for the printing of a series of slightly oversize 2D slices for forming the 3D object in the manner generally described above. Data storage device 330 may be used to store a reference image, for example, of a substrate known to have provided a suitable object.

The data storage device(s) 330 may include a random access memory (RAM) or another type of dynamic storage device that is capable of storing updatable database information, and for separately storing instructions for execution of system operations by, for example, processor(s) 320. Data storage device(s) 330 may also include a read-only memory (ROM), which may include a conventional ROM device or another type of static storage device that stores static information and instructions for processor(s) 320. Further, the data storage device(s) 330 may be integral to the exemplary control system 150, or may be provided external to, and in wired or wireless communication with, the exemplary control system 150, including as cloud-based data storage components.

The exemplary control system 150 may include at least one data output/display device 340, which may be configured as one or more conventional mechanism that output information to a user, including, but not limited to, a display screen on a GUI of an AM 3D object forming device with which the exemplary control system 150 may be associated. The display device 340 can also include Augmented Reality (AR) hardware, such as that used in AR head-mounted displays (HMD), AR Eyeglasses, or AR Head-Up-Display (HUD) technology. The data output/display device 340 may be used to indicate to a user a status of an AM 3D object forming operation effected by the device with which the exemplary control system 150 may be associated including an operation of one or more individually controlled components at one or more of a plurality of separate processing stations in the device.

The exemplary control system 150 may include one or more separate external communication interfaces 350 by which the exemplary control system 150 may communicate with components external to the exemplary control system 150. At least one of the external communication interfaces 350 may be configured as an input port to support connecting an external CAD/CAM device storing modeling information for execution of the control functions in the AM 3D object forming operations. Any suitable data connection to provide wired or wireless communication between the exemplary control system 150 and external and/or associated components is contemplated to be encompassed by the depicted external communication interface 350.

The exemplary control system 150 may include a 2D slice image forming control unit 360 that may be used to control the a tri-level electrophotographic layer printing process that produces the series of 2D slices for the in-process 3D object according to devolved 3D object modeling information. The 2D slice image forming control unit 360 may operate as a part or a function of the processor 320 coupled to one or more of the data storage devices 330, or may operate as a separate stand-alone component module or circuit in the exemplary control system 150. Either of the processor 320 or the 2D slice image forming control unit 360 itself may parse the input 3D object model information to determine and execute a layer-by-layer 2D slice material layer printing scheme in the AM 3D object forming device.

The exemplary control system 150 may include a 2D slice fusing/fixing control unit 370 as a part or a function of the processor 320 coupled to one or more of the data storage devices 330, or as a separate stand-alone component module or circuit in the exemplary control system 150. The 2D slice fusing/fixing control unit 370 may be usable to control the functioning of one or more of a heat and/or pressure implemented 2D slice layer fixing process according to known methods derived from 2D xerographic image forming operations to join the individual 2D slices to one another.

The exemplary control system 150 may include a 3D object finisher control unit 380 for executing a final 3D object shaping scheme on a processed stack of cut and joined 2D slices in a subtractive machining process that may remove the layered support component structure and surface finish the 3D object. As with the above-enumerated other separate control units, the 3D object finisher control unit 380 may operate as a part or a function of the processor 320 coupled to one or more data storage devices 330 for executing finishing device operations, or may operate as a separate stand-alone component module or circuit in the exemplary control system 150.

All of the various components of the exemplary control system 150, as depicted in FIG. 3, may be connected internally, and to one or more AM 3D object forming devices, by one or more data/control busses 390. These data/control busses 390 may provide wired or wireless communication between the various components of the exemplary control system 150, whether all of those components are housed integrally in, or are otherwise external and connected to an AM 3D object forming device with which the exemplary control system 150 may be associated.

It should be appreciated that, although depicted in FIG. 3 as an integral unit, the various disclosed elements of the exemplary control system 150 may be arranged in any combination of sub-systems as individual components or combinations of components, integral to a single unit, or external to, and in wired or wireless communication with the single unit of the exemplary control system 150. In other words, no specific configuration as an integral unit or as a support unit is to be implied by the depiction in FIG. 3. Further, although depicted as individual units for ease of understanding of the details provided in this disclosure regarding the exemplary control system 150, it should be understood that the described functions of any of the individually-depicted components, and particularly each of the depicted control units, may be undertaken, for example, by one or more processors 320 connected to, and in communication with, one or more data storage device(s) 330.

Figure 4:
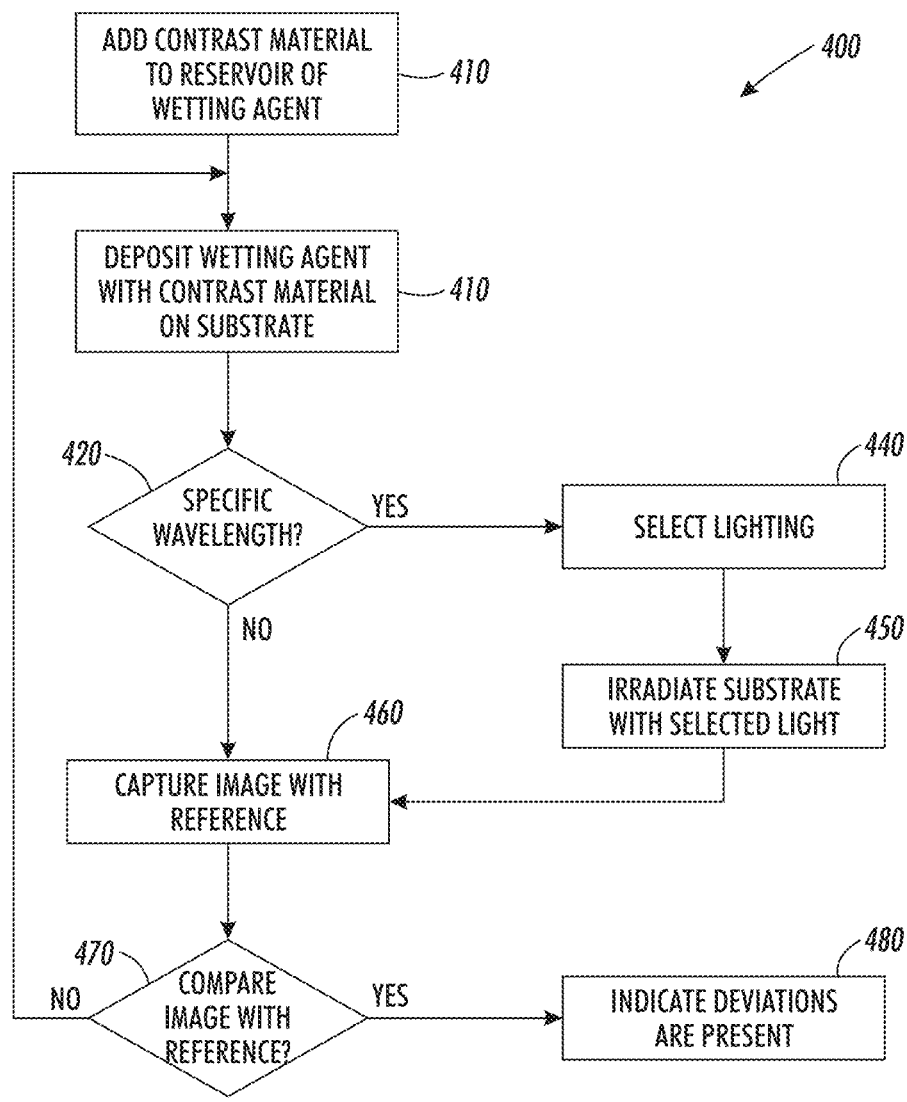

The disclosed embodiments may include exemplary methods for implementing an AM 3D object forming scheme using a tri-level electrostatic process for 2D slice forming for building up an in-process 3D object. FIG. 4 illustrates a flowchart of such an exemplary method.

FIG. 4 is a flowchart depicting the operation of an exemplary method for in-line quality checking of an object manufacturing system in accordance to an environment.

Interconnection between the processes represents the exchange of information between the processes. Once the flow is modelled, each process may be implemented in a conventional manner. Each process may, for example, be programmed using a higher level language like Java, C++, Python, Perl, or the like, or may be performed using existing applications having a defined interface. For example, the function of certain processes may be provided by remote web servers using conventional web interfaces like CGI scripts or the like. As well, flow programming allows individual process to execute on different hardware and software platforms, or through the actions of an operator where possible, that may physically remote from each other. Upon execution, a run-time environment (including run-time code) acts as a flow engine and ensures co-operation between processes in accordance with the flow model. The run-time code typically looks after process execution; inter-process communication; errors; system crashes and the like. Conveniently, programmers and architects need not be concerned about these details as they are handled by run time code.

Method 400 begins with action 310 where contrast material is added to a reservoir of wetting agent material. The adding could be done through the opening of valves by controller 150 based on the best suited material for the substrate 118 being used. This contrast material can take the form of a liquid, a dye, or material solid at room temperature that dissolves when immerse in a liquid bath like reservoir 220. Control is then passed to action 420 where the wetting agent with added contrast material is deposited like shown in fluid 126 of FIG. 1. Control is then passed to action 430 where a determination/decision is made as to the use visible light or the use of a special light that when in contact with the fluid (wetting and contrast) causes the fluid to react or initiate a contrast-enhancing property for a duration of the irradiation. The contract enhancing property is in the form of IR or UV light. In the event that the decision is a specialty light is required for imaging purposes then control is passed action 440 where the specialty light is selected. The specialty light can be IR, UV light or any other light that causes an image enhancing property to be activated. Control is then passed to action 450 where the substrate is illuminated with the specialty light for a desired amount of time. The amount of time can be set to a time to traverse the distance between the light source 255 and the imager 210. Control is then passed to action 460. As can be seen from the flowchart of method 400 there are two path 460. Control is received at 460 from action 450 or action 430, Regardless of the origin of the command, in action 460 an image of the substrate is acquired. This image is the inspection image of the substrate after the wetting fluid has been deposited and when using imager 110 in place of imager 210 after the powder and wetting agent were applied to the substrate. Control is then passed to action 470 for a comparison.

In action 470, a comparison of the inspection image is compare to a reference image and inferences are made as to the state of the printhead, substrate, and adequacy of the contrast agent. Various comparison metrics may be utilized to determine the degree of matches between the relative values for pixels in the inspection image and corresponding pixels in the reference image. Relative values may be combined with conventional techniques as part of an inspection process. The inspection may be performed using an optical inspection tool that uses conventional techniques to identify defect candidates, with relative value analysis performed on areas containing defect candidates to confirm or deny the existence of a defect. If a result of the comparison it is ascertain or determined that deviations such missing jets, voids, and application of the wetting are present then control passes action 480 where an indication in the form of a message is generated. The message can then be interpreted by the controller to indicate that deviations have been found in the processing or part of the substrate 118. The message can also be forwarded to the system stop or continue the process based on a desired quality protocol. In the event that no deviations have been identified control passes to action 420 where the method is applied to another substrate in the composite based additive manufacturing system 100.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. A method for in-line quality checking of an object manufacturing system that fabricates a three-dimensional (3D) object, comprising: maintaining in a reservoir a wetting agent that can be selectively deposited in a desired pattern onto portions of a sheet of substrate material, wherein a sheet of substrate material corresponds to a layer of the 3D object; adding a contrast material to the reservoir of wetting agent so as to be detectable by an imaging sensor;
   depositing the wetting agent with contrast material onto the sheet of substrate material;
   capturing with the imaging sensor an image of the sheet of substrate material after depositing the wetting agent with contrast material; and using the captured image of the sheet of substrate material to ascertain deviations as a result of a comparison of the captured image with a reference image.

2. The method in accordance to claim 1, further comprising:
   using at least one inkjet printhead to selectively deposit the wetting agent with the contrast material.

3. The method in accordance to claim 2, wherein the contrast material is an additive that glows when stimulated by a specific wavelength of light energy.

4. The method in accordance to claim 2, wherein the sheet of substrate material is a high contrast surface or a low contrast surface.

5. The method in accordance to claim 4, wherein the contrast material is selected based on the contrast surface of the substrate material.

6. The method in accordance to claim 5, wherein the contrast material is a dye.

7. The method in accordance to claim 6, wherein the ascertained deviation is at least one of a defective substrate, or a missing printhead.

8. The method in accordance to claim 3, the method further comprising:
   using an imaging source to emit a specific wavelength of light energy coordinated with a time instant of an irradiation session such that the contrast material gives out a contrast-enhancing property for a duration of the irradiation session.

9. The method according to claim 8, wherein the imaging source emits a signal with a wavelength of ultra violet (UV), infrared (IR), or both.

10. A apparatus for in-line quality checking of an object manufacturing system that fabricates a three-dimensional (3D) object, comprising: a reservoir containing a wetting agent that can be selectively deposited in a desired pattern onto portions of a sheet of substrate material, wherein a sheet corresponds to a layer of the 3D object; an inlet at the reservoir of the wetting agent to receive a contrast material so that the wetting agent when on the substrate is detectable by an imaging sensor; an imaging sensor for capturing an image of the sheet of substrate material after depositing the wetting agent with contrast material; and a processor coupled to a storage device, wherein the storage device contains instructions operative on the processor to ascertain deviations as a result of a comparison of the captured image of the sheet of substrate material and wherein the processor is programmed to control the apparatus to add the contrast via the inlet reservoir to the wetting agent, deposit the wetting agent with contrast onto the sheet material, capture an image of the deposited wetting agent with the added contrast material and compare with a reference image the captured image using the instructions stored on the storage device.

11. The apparatus in accordance to claim 10, further comprising:
   at least one inkjet printhead to selectively deposit the wetting agent with the contrast material.

12. The apparatus in accordance to claim 11, wherein the contrast material is an additive that glows when stimulated by a specific wavelength of light energy.

13. The apparatus in accordance to claim 11, wherein the sheet of substrate material is a high contrast surface or a low contrast surface.

14. The apparatus in accordance to claim 13, wherein the contrast material is selected based on the contrast surface of the substrate material.

15. The apparatus in accordance to claim 14, wherein the contrast material is a dye.

16. The apparatus in accordance to claim 15, wherein the ascertained deviation is at least one of a defective substrate, or a missing printhead.

17. The apparatus in accordance to claim 12, the apparatus further comprising:
- an imaging source to emit a specific wavelength of light energy coordinated with a time instant of an irradiation session such that the contrast material gives out a contrast-enhancing property for a duration of the irradiation session.

18. The apparatus according to claim 17, wherein the imaging source emits a signal with a wavelength of ultra violet (UV), infrared (IR), or both.

* * * * *